United States Patent Office 3,203,295
Patented Aug. 31, 1965

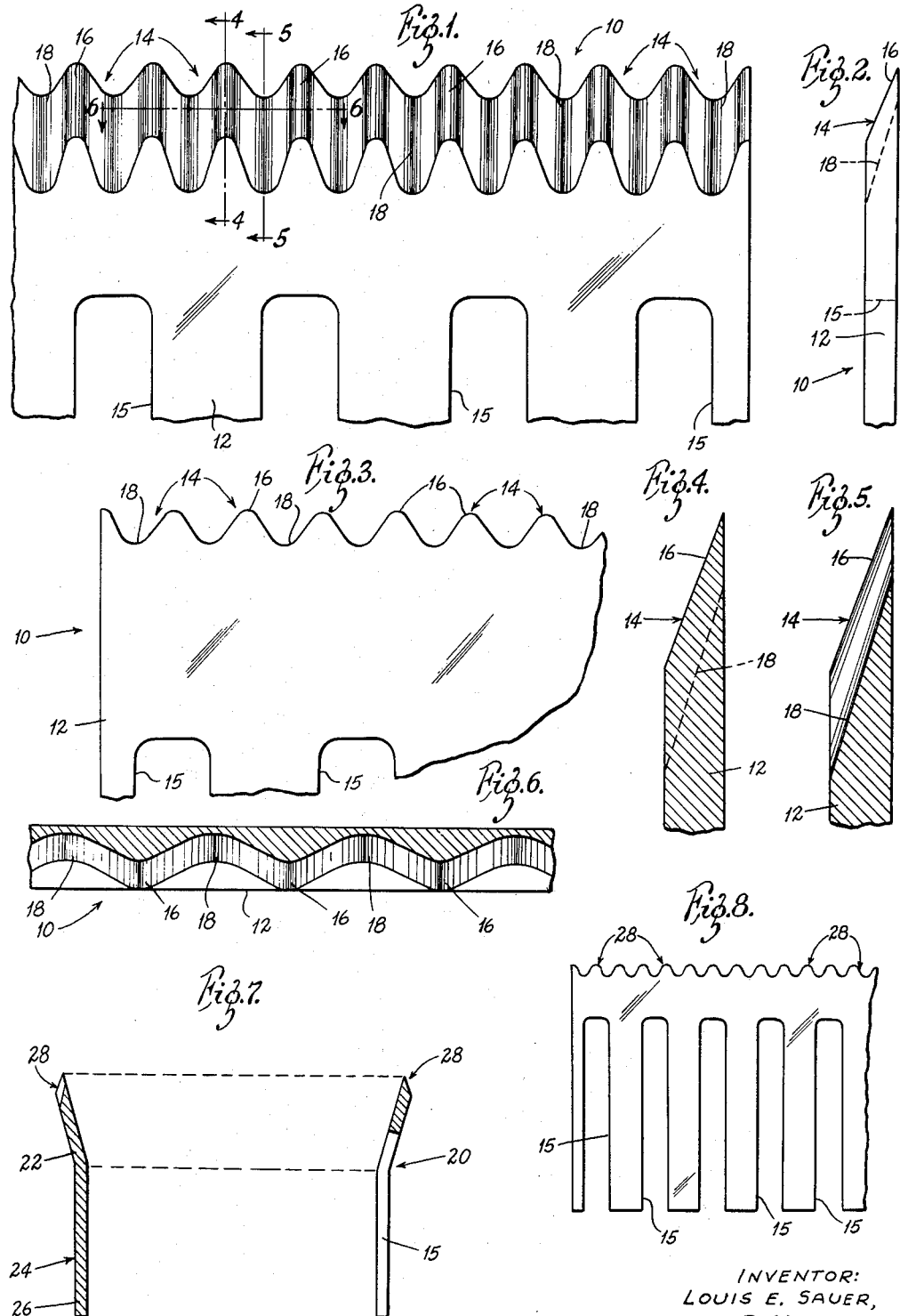

3,203,295
CUTTING RULE CONSTRUCTION
Louis E. Sauer, St. Louis, Mo., assignor to L. E. Sauer Machine Company, St. Louis, Mo., a corporation of Missouri
Filed Jan. 17, 1963, Ser. No. 252,218
6 Claims. (Cl. 83—673)

The present invention relates generally to the cutting art, and more particularly to cutting rules, blades or knives employed on rolls or cylinders.

In cutting cardboard, corrugated paperboard, paperboard in general, and many other materials, by rotary cutting means, the cutting rule is mounted on a rotating cylinder and cuts against and into an opposed rotating cylinder covered with rubber, polyurethane, or the like. It is not feasible expensewise for general operations to cut against a metal cylinder, as in precision pinch cutting, or against a complementarily grooved metal cylinder. Presently employed rules act like milling cutters and cut out portions of resilient covers, rendering the same useless in a short time, obviously expensive both as to replacement and down time. Additionally, rules heretofore employed often wedge rather than cut the material being processed. Present circular rules tear and crush material.

Therefore, an object of the present invention is to provide a cutting rule constructed to obviate the deficiencies in existing rules and to supply the above-mentioned long existing need.

The present rule comprises a body portion and continuous repetitious teeth formed along an edge thereof. The teeth are wavy in general appearance, and present no sharp apices or valleys. The cutting edge is smooth and somewhat resembles a sine-cosine curve. For best cutting effect, the valley lines diverge from the apex lines. In circular form, the cutting edge is of greater diameter than the supporting collar.

Hence, another object of the present invention is to provide a rule which will slide through the resilient cover of the supporting roller with little or no damage.

Another object is to provide a novel rule which cuts the material as required and eliminates wedging in the valley portions of the teeth.

Another object is to provide a novel rule for rotary cutting which effectively cuts material as required with substantially no damage to the resilient cover of the supporting roller or cylinder.

Another object is to provide a novel circular rule for rotary cutting which overcomes the crushing and tearing effects of presently used circular rules.

The foregoing and other objects and advantages are apparent from the following description taken with the accompanying drawing, in which:

FIGURE 1 is a front side elevational view of a segment of a rule made in accordance with the teachings of the present invention, looking at the beveled teeth;

FIGURE 2 is an end elevational view thereof;

FIGURE 3 is a rear side elevational view thereof;

FIGURE 4 is an enlarged vertical cross-sectional view taken on the line 4—4 of FIGURE 1;

FIGURE 5 is an enlarged vertical cross-sectional view taken on the line 5—5 of FIGURE 1;

FIGURE 6 is an enlarged horizontal cross-sectional view taken on the line 6—6 of FIGURE 1;

FIGURE 7 is a cross-sectional view through a circular rule or cutter incorporating the present invention; and FIGURE 8 is a rear side elevational view of a section of a rule showing the relationship of the slots to the teeth.

Referring to the drawing more particularly by reference numerals, 10 indicates generally a rule or blade incorporating the concepts of the present invention, a section thereof being illustrated in FIGURE 1. The rule 10 includes a body portion 12 and teeth 14. Slots 15 are formed in the body portion 12. Rules 10 presently in use are about one inch in height, but this may be greater or lesser, as required.

Each tooth 14 includes a rounded convex apex 16. The juncture or valley 18 between contiguous teeth 14 is concave, as illustrated. FIGURE 3 gives a clear view of the continuous outline of the teeth 14, which resembles a sine-cosine curve. It will be noted from FIGURES 4 and 5 that the slope of the valleys 18 is greater than the slope of the apices 16. This provides maximum cutting effect. The slope of the valleys 18 can be greater, since the material leading to the apices 16 at each side strengthens each. If the slope of the apices 16 is too great, obviously, they will bend in severe cutting operations.

In FIGURE 7 is illustrated a round rule 20 in which a segment 22 of the body portion 24 is flared in respect to the mounting segment 26. This disposes teeth 28 thereof at an angle which prevents tearing the resilient covering of the supporting roller and the paperboard. When the body portion 24 is straight, instead of flared, paperboard and other material cut thereby will have crushed and torn edges. The flared disposition of the teeth 28 result in clean cuts. The slots 15 permit forming of the rule 20 as shown, since they will narrow to accommodate stresses in the metal.

In use, the teeth 14 of the rule 10 have a little slippage in going through the rubber, polyurethane, or the like, cover of the supporting roller. The wavy construction of the teeth 14 glide substantially without tearing or milling. In addition, the rounded smooth valleys 18 cut the material being processed rather than wedge it, thereby effecting a clean cut.

It is apparent that there has been provided a rule which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:
1. A rule comprising a body portion including a continuous closed supporting segment, a continuous closed teeth supporting segment integral with said first segment and flared in respect thereto, and teeth at the free edge of said teeth supporting segment.
2. The rule of claim 1 in which said teeth have curved apices and valleys.
3. The rule of claim 2 in which the valleys have greater slope than the apices.
4. The rule of claim 2 in which the supporting segment includes open-ended slots.
5. The rule of claim 1 in which the supporting segment includes open-ended slots.
6. A rule comprising a supporting portion, and teeth along an edge, said teeth defining a cutting line having rounded apices and valleys, said teeth comprising bevelled alternating convex and concave portions extending from said apices and valleys, respectively, said valley concave portions having a greater slope than the said apices convex portions.

References Cited by the Examiner

UNITED STATES PATENTS

| | | | |
|---|---|---|---|
| 1,009,232 | 11/11 | Foster | 83—679 |
| 2,467,585 | 4/49 | Finkelstein | 83—679 |
| 2,863,337 | 12/58 | Ackley. | |

FOREIGN PATENTS 886,832  1/62  Great Britain.

WILLIAM W. DYER, Jr., *Primary Examiner.*

HUNTER C. BOURNE, Jr., ANDREW R. JUHASZ, *Examiners.*